United States Patent [19]

Lee et al.

[11] 3,890,488

[45] June 17, 1975

[54] DIGITAL PRINT AND PUNCH TAPE RECORDER HAVING READ-WRITE MEMORY

[75] Inventors: Harold G. Lee; Henry O. Peterson, both of Portland, Oreg.

[73] Assignee: Leupold & Stevens, Inc., Beaverton, Oreg.

[22] Filed: Dec. 5, 1973

[21] Appl. No.: 421,826

[52] U.S. Cl................... 235/61.9 A; 101/19; 178/3; 234/37

[51] Int. Cl........ G06k 1/05; H04l 15/32; B44b 5/00

[58] Field of Search.................. 101/19; 234/35, 37; 235/61.1, 61.9 R, 61.9 A, 61.11 R; 178/3; 164/113; 197/19, 20

[56] References Cited

UNITED STATES PATENTS

| | | | |
|---|---|---|---|
| 2,174,731 | 10/1939 | Dirkes | 164/113 |
| 2,993,642 | 7/1961 | Fender | 101/19 |
| 3,331,483 | 7/1967 | Hoamann | 234/37 |
| 3,439,119 | 4/1969 | Gehrmann | 178/3 |
| 3,448,247 | 6/1969 | Jones | 235/61.1 |
| 3,502,187 | 3/1970 | Becking | 197/20 |
| 3,795,793 | 3/1974 | Boyer | 235/61.1 |

*Primary Examiner*—Daryl W. Cook
*Assistant Examiner*—Robert M. Kilgore
*Attorney, Agent, or Firm*—Klarquist, Sparkman, Campbell, Leigh, Hall & Whinston

[57] ABSTRACT

A digital recorder for simultaneously printing and punching digital data, such as vehicle traffic information, on the same tape is described. The recorder employs an electronic read-write memory including a digital counter between a data signal input and a step motor which rotates a punch cam drum and a print wheel on the same shaft. The punch cam drum includes a plurality of cam discs having cam projections and recesses arranged in a binary code to provide a binary coded decimal readout for recording the digital data on punched tape. As a result of such memory, the digital information can be recorded at a slower rate and at a later time than it is received. A pressure sensitive printing tape is employed for recording both punched and printed information. A second motor moves a punch head to cause punch pins to engage the punch cams and to punch binary coded holes in the tape. Such punch head also has a print anvil resiliently mounted thereon for causing the tape to strike the print wheel and print numbers or characters thereon corresponding to the binary coded holes punched therein.

21 Claims, 6 Drawing Figures

DIGITAL PRINT AND PUNCH TAPE RECORDER HAVING READ-WRITE MEMORY

BACKGROUND OF THE INVENTION

The present invention relates generally to punched tape recorders and in particular to digital punched tape recorders which employ an electronic read-write memory circuit for receiving and storing input data signals and for reading out and recording such signals later at a slower rate than they are received. The punched tape recorder of the invention also prints numbers or characters on the tape of the same data information as the binary coded punched holes adjacent thereto, to enable visual readout of the digital information, and may employ pressure sensitive printing tape for this purpose. A punch cam drum having binary coded cam projections and recesses which is rotated by a step motor actuated by the output of the memory, is employed to actuate punch pins in the punch means by such cams to reduce electrical power consumption. The print wheel is provided on the same shaft as such cam drum to enable simultaneous printing and punching of the same digital information on such tape.

The punched tape digital recorder of the present invention is especially useful as a portable, battery operated recorder for intermittent recording of digital information in remote areas, and may be employed as a vehicle traffic counter apparatus positioned alongside a road.

It has previously been suggested to provide a digital punched tape recorder which prints and punches digital information on the same tape by means of a print wheel and a punch cam drum provided on the same motor driven shaft, as shown in U.S. Pat. No. 2,993,642 of K. L. Fender et al., granted July 25, 1961. However, this prior apparatus had several disadvantages because it did not employ a digital read-write electronic memory for writing and storing digital data input signals and for reading out electrical data output signals to the cam motor to record such signals later at a slower rate than they are received. Instead, the cam drum of such prior apparatus is continuously rotated and is stopped for recording by actuating an electromagnetic latch and associated relay actuated by a thyratron with an analog input signal provided by manually operated switches, which greatly increases power consumption. In addition, this prior apparatus does not employ pressure sensitive printing tape for both punching and printing the same digital information adjacent to each other on a single tape.

It has also previously been suggested in price-tag making apparatus, such as shown in U.S. Pat. No. 2,991,710 of Harwood, granted July 11, 1961, to provide the tags with both printed and punched information on price, size, etc., which is stored in a prewired read-only type memory. However, unlike the present invention, there is no provision for using a read-write digital memory which enables writing in data and later reading out such data at a slower rate in the manner of the present invention. In addition, this prior apparatus employs solenoid actuated punches which consume a large amount of electrical power and are not suitable for a battery operated recording apparatus, like that of the present invention. To a similar effect is U.S. Pat. No. 3,702,344 of R. A. Newmeyer, granted Nov. 28, 1972, which also employs solenoid operated punches or printers in a traffic recorder.

SUMMARY OF INVENTION

It is, therefore, one object of the present invention to provide an improved punched tape recorder employing an electronic read-write memory which is capable of receiving data input signals at an extremely high rate, storing such input signals and recording them at a slower rate.

Another object of the present invention is to provide such a recorder of a simple, light weight, portable construction which employs a single cam drum and associated punch means to record a multiple digit data number, serially one digit at a time.

A further object of the present invention is to provide such a recorder of low power consumption which employs cam actuated punches that are operated by engagement with a cam drum driven by a step motor connected to the output of the memory, to enable battery operation of the recorder for a long period of time.

An additional object of the invention is to provide such a recorder which also prints numbers or characters corresponding to the punched data on the same tape to enable such tape to be read by visual inspection or by electronic means, such as a teletype, which transforms the punched data into electrical pulses that are fed to a digital computer or other data processor.

Still another object of the present invention is to provide such a recorder with pressure sensitive printing tape to provide a simple, reliable printing operation and with an improved tape advance ratchet means.

A still further object of the invention is to provide such a recorder with greater accuracy employing an improved digital memory and control means which is capable of receiving and storing additional input data bits during the punching period of a multiple digit data number and of subtracting the punched number from the memory without losing data bits.

A still additional object of the invention is to provide such a recorder with a differential drive means for moving the punch cam drum between digits of the multiple digit number being punched without homing to reduce the punching period time.

BRIEF DESCRIPTION OF DRAWINGS

Other objects and advantages of the present invention will be apparent from the following detailed description of a preferred embodiment thereof and from the attached drawings of which.

DESCRIPTION OF PREFERRED EMBODIMENT

Figure 1:
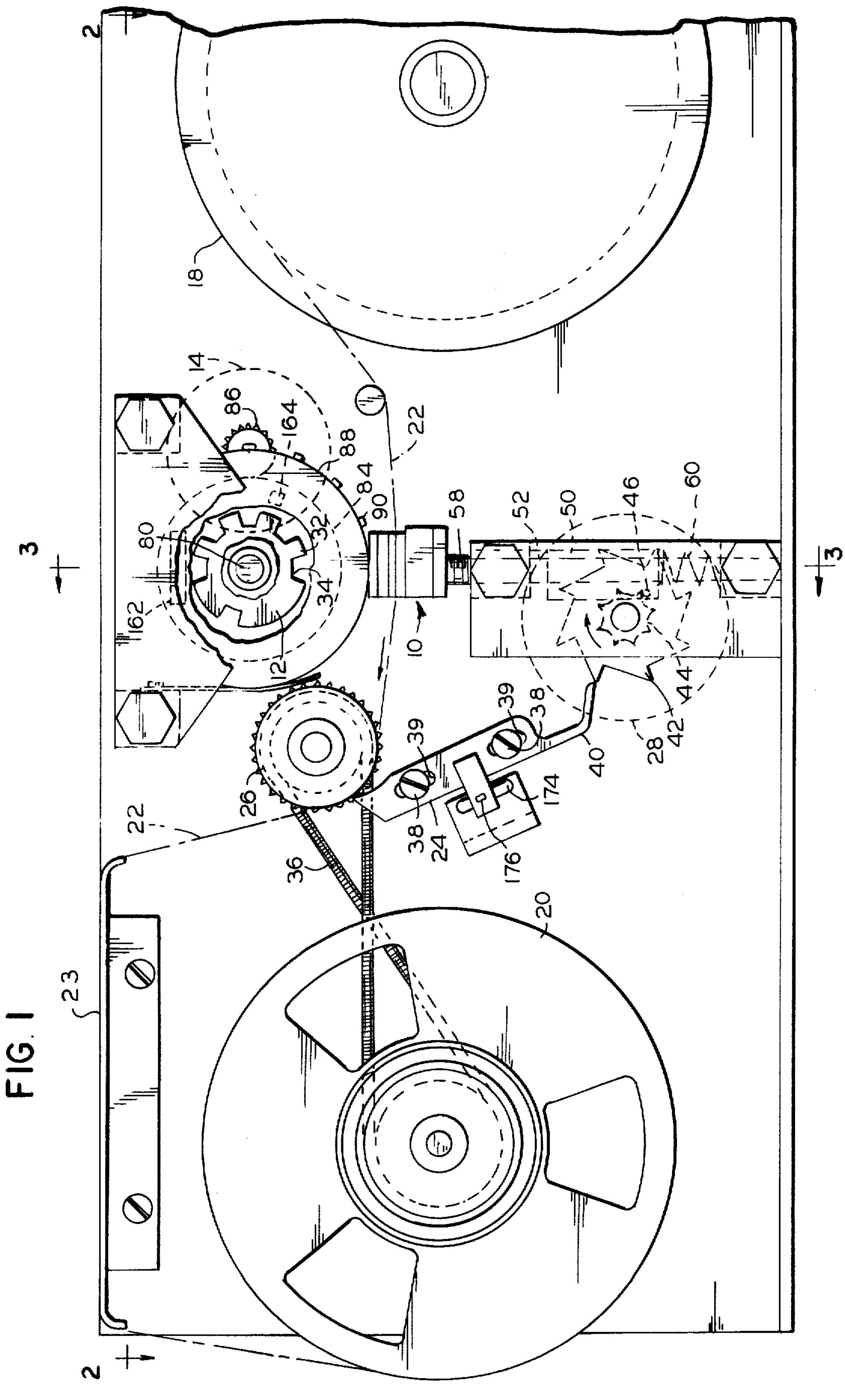
FIG. 1 is a plan view of the punched tape recorder of the present invention with parts broken away to show its internal mechanism.
Figure 2:
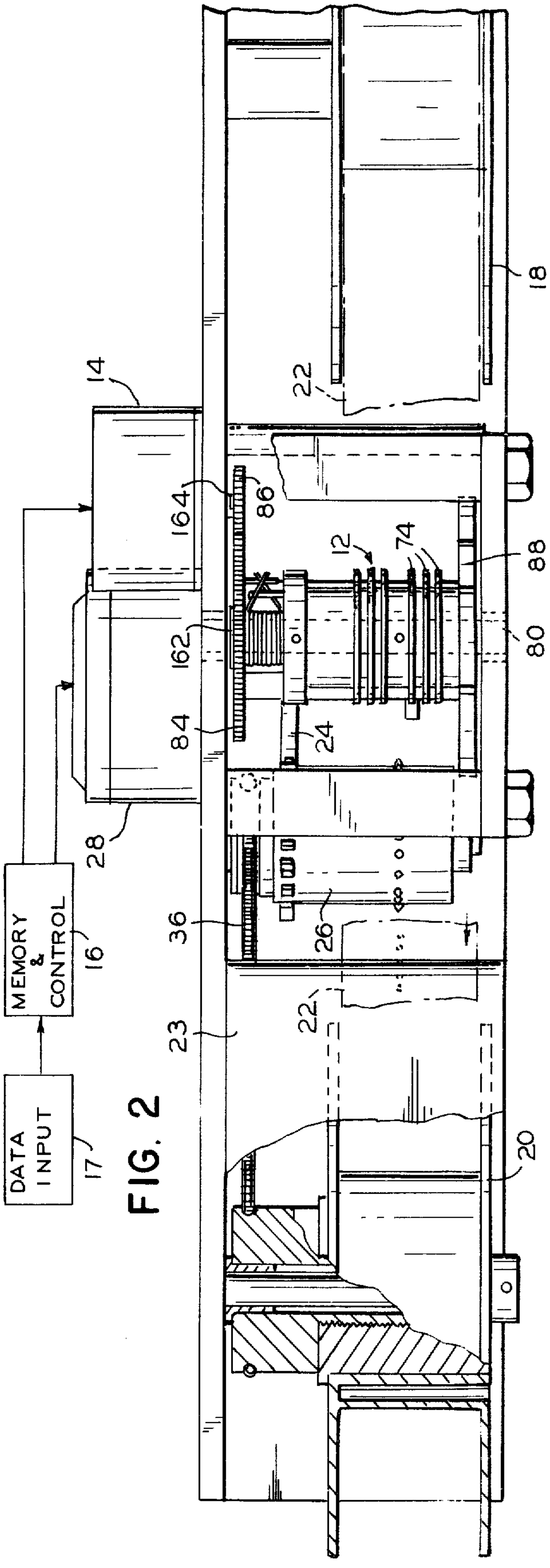
FIG. 2 is a horizontal section view taken along the line 2—2 of FIG. 1 with parts broken away for clarity.

As shown in FIGS. 1 and 2, a punched tape recorder in accordance with the present invention includes a cam actuated punch means 10 which is actuated by movement into engagement with a rotary cam drum 12. The cam drum is driven in intermittent steps by an electric motor 14 in accordance with digital data pulses applied thereto. The digital data pulses are supplied by an electronic memory and control circuit 16 which contains a read-write memory including a digital counter, such as the serial input, serial output shift register hereafter described in FIG. 6.

The memory and control circuit 16 is connected to a source 17 of digital data input pulses, such as the pneumatically actuated road tube switches provided when the recorder is employed to record automobile and truck traffic.

The recorder includes a tape supply reel 18 and a tape takeup reel 20 which are rotatably mounted in a conventional manner, and cause a paper tape 22 to be advanced from reel 18 to reel 20 through the punch means 10 which records the digital data information provided by the cam drum 12 in the form of binary coded holes punched in such tape. The tape is advanced intermittently across a tape table 23 to the takeup reel 20 by a ratchet means which may include an improved pawl 24 and a cooperating ratchet wheel 26. The pawl is moved by another electric motor 28 which also operates the punch means 10 to raise it until a row of punch pins 30 engage raised or recessed cam portions 32 and 34 on the cam drum 12 to cause punching in a manner hereafter described in connection with FIGS. 3 and 4. The tape table 23 facilitates visual observation of the printed data on the tape and enables manual marking of the tape.

The tape advance ratchet wheel 26 is coupled to the takeup reel 20 by a coil spring 36 or other suitable resilient coupling to rotate such takeup reel when such ratchet wheel is rotated by the pawl 24. The pawl 24 slides longitudinally along guide pins 38 provided within elongated slots 39 in such pawl when a spring-like end portion 40 of such pawl is pushed upward by a sawtooth actuator wheel 42 rotated clockwise in FIG. 1 on the shaft of the step motor 28. The ends of slots 39 limit movement of the pawl by engagement with pins 38. The spring arm 40 is of a lever shape and may be formed of a resilient plastic material such as "Delrin" (linear polyoxymethylene-type acetal resin). This spring arm 40 insures that the pawl is driven upward sufficiently to always cause the tape 22 to advance one complete step since the overdrive provided by such spring compensates for any wear of the ratchet and pawl.

Figures 3, 4:
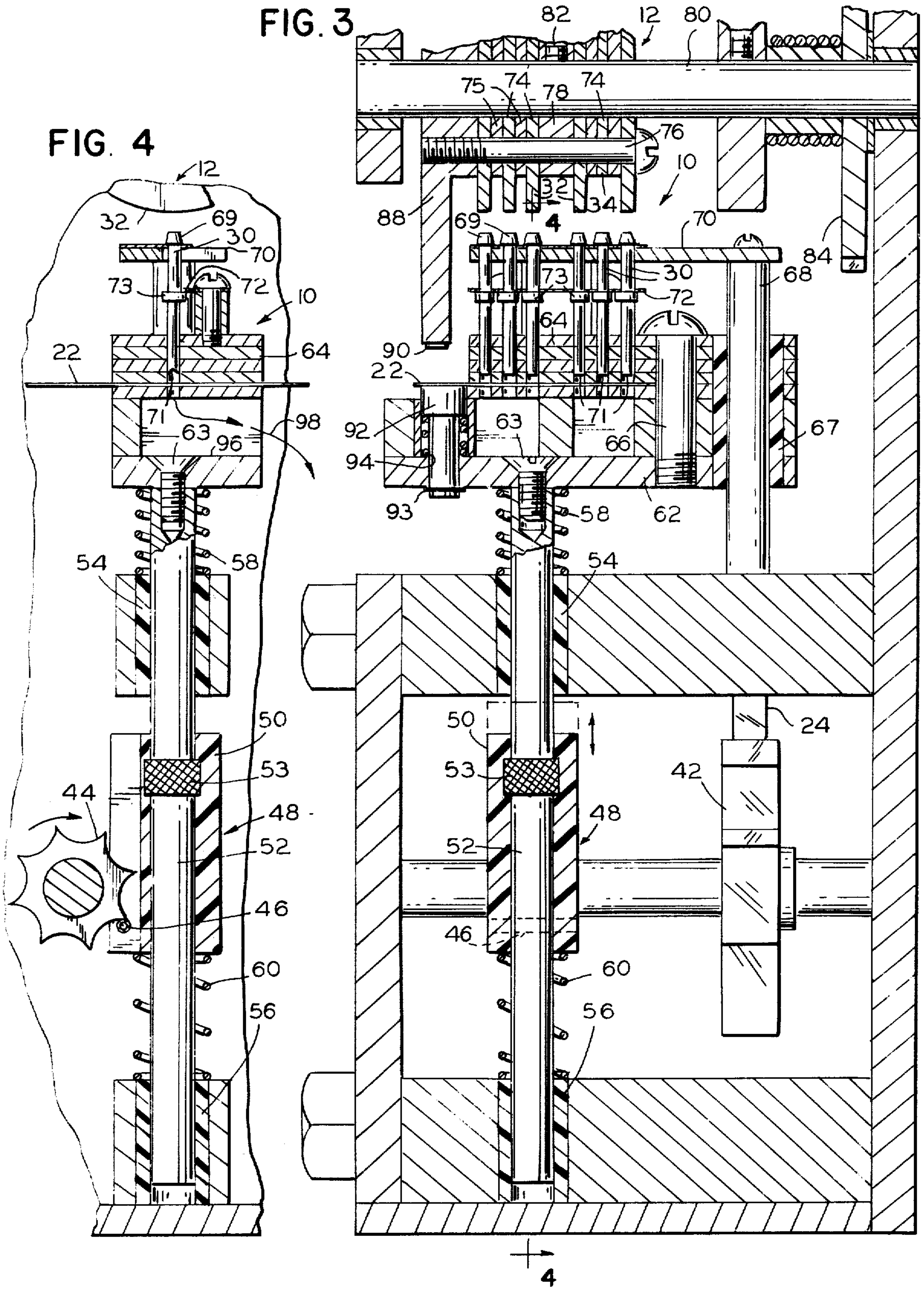
FIG. 3 is a vertical section view taken along the line 3—3 of FIG. 1.
FIG. 4 is a vertical section view taken along the line 4—4 of FIG. 3.

Simultaneously with rotation of the ratchet actuating wheel 42, a star wheel 44 is rotated by motor 28 so that one of its teeth engages a coupling pin 46 attached to the punch carriage means 48 to move such carriage down and compress drive springs which cause such punch carriage to quickly move upward and operate the punch means 10 when the pin disengages from the star wheel tooth. As shown in FIGS. 3 and 4, the punch carriage 48 includes a plastic sleeve 56 which is fixedly attached to a carriage shaft 52, such as by an enlarged knurled shoulder 53 on the shaft, for reciprocal movement of such shaft by means of the coupling pin 46, which is attached to the sleeve 50. Thus, the punch carriage shaft 52 is mounted for sliding movement within two fixed plastic bearing sleeves 54 and 56 and is driven upward to cause punching by a pair of coil springs 58 and 60, respectively, positioned between the upper sleeve 54 and the bottom of a punch head support plate 62 attached to shaft 52 by a bolt 63, and between the lower sleeve 56 and the bottom of the punch carriage sleeve 50.

The punch means 10 includes a punch head 64 having a row of passageways through which the punch pins 30 extend, and such punch head is fixedly attached to the support plate 62 by a bolt 66 for movement therewith along a fixed guide post 68 passing through a bearing sleeve 67 in the punch head. The enlarged top end 69 of each of the punch pins 30 engages a stop plate 70 attached to the guide post 68 during downward movement of the punch head 64 along such guide post after punching to cause the punch pins to be retracted so that their lower ends 71 are above the level of the tape 22, thereby permitting such tape to be advanced. A retainer comb 72 attached to the punch head 64 by a bolt retains the pins 30 in the punch head by comb fingers engaging the upper shoulders of stop flanges 73 provided on such pins. In addition, the stop plate 70 also "clears" the pins from their coded punch positions into the same initial position so they are ready for punching the next number. As stated above, punching is accomplished upon upward movement of the punch carriage shaft 52 and the punch head 64 by compression and release of the drive springs 58 and 60 when the punch motor 28 is advanced one step by the memory and control circuit 16. This causes the punch pins 30 to slide upward through the stop plate 70 until some of such pins stop when they come into engagement with the raised cam surfaces 32 of the punch cam means 12. Continued upward movement of the punch head 64 causes the lower ends 72 of these stopped punch pins to slide through the punch head to punch the paper tape 22 transmitted through such head. However, other punch pins which are in alignment with recessed cam portions 34 are not stopped and do not cause punching because they do not engage the cam means 12. In this manner, the tape 22 is punched with binary coded holes representing decimal numbers or other digital information corresponding to the input data signal transmitted from the memory and control circuit 16 to the cam motor 14 which rotates the cam drum means 12 into the appropriate readout position.

Each digit of a multi-digit data number stored in the memory 16 is read out serially one digit at a time to the cam motor 14 and the cam drum means 12 so that such digits are punched one at a time on tape 22. As a result of storage of the digital input signal in memory 16, such recording can take place at a later time and at a much slower rate than data is received by the memory.

The punch cam "drum" 12 may be in the form of a single integral cam drum or it may be in the form of a plurality of cam discs 74 separated by spacer discs 75 which are all fastened together by a bolt 76 that also passes through a common support and spacer plate 78 fixed to a cam shaft 80 by a set screw 82. The cam shaft 80 is driven by gears 84 and 86 which are connected to the shaft of the cam motor 14, as shown in FIG. 2. The cam discs 74 are each provided with 10 cam segments 32 or 34 uniformly spaced around their outer edge and arranged in a binary code.

In addition, the cam shaft 80 may also have at least one print wheel 88 mounted thereon by means of bolt 76. The print wheel is provided with printing indicia 90 on its periphery at 10 rotational positions corresponding to the 10 positions of the punch cams 74, such indicia being a decimal number or a character corresponding to the binary code of such cams at such positions. The print wheel indicia 90 strikes the punched tape 22 immediately above a print platen 92 carried on the punch head support plate 62. The print platen 92 has an enlarged head or anvil on one end of a post which extends through a hole in the support plate 62 and has a stop clip 93 provided on its other end. The print platen is resiliently biased upward by a coil spring 94 surrounding such post and extending between such head and the upper side of support plate 62, with the stop clip 93 engaging the lower side of such plate.

The punched tape 22 may be of a pressure sensitive printing paper which prints numbers by impact without using printing ink or a separate carbon ribbon. There are several different types of suitable impact printing paper including those which employ encapsulated chemicals which chemically react to produce a black or other colored print when the capsules are ruptured by impact. It should be noted that the paper chaff produced by punching is transmitted through an aperture 96 in the punch head and out into a collecting box in the direction of arrows 98, as shown in FIG. 4.

Figure 5:
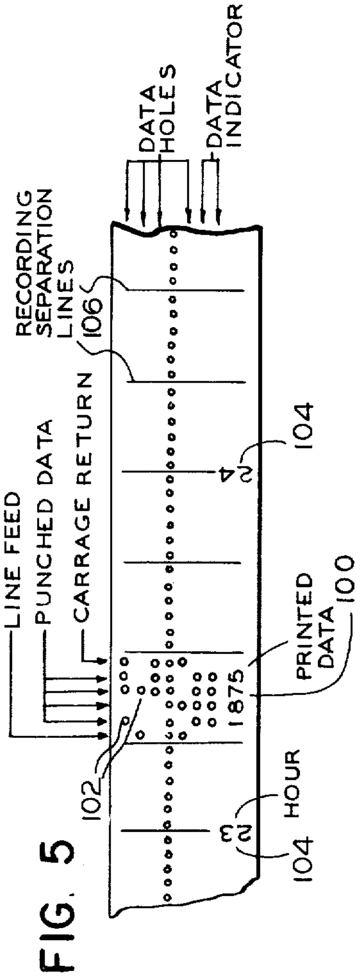
FIG. 5 is a plan view of a punched tape produced by the recorder of the present invention.

As shown in FIG. 5, a punched tape 22 produced by the recorder of the present invention includes printed data numbers or character indicia 100 adjacent to four rows of punched binary coded data holes 102. Thus, for example, the holes 102 may provide a binary code four digit data number of "1875" punched on the tape which also has such number printed thereon by indicia 100. In addition, the tape may be provided with preprinted time information such as hour indicia 104 and 15-minute time lines 106 which separate the data number recordings. In addition to data holes, a "line feed" row of holes and a "carriage return" row of holes may be provided, respectively, at the beginning and end of the data holes to provide control information for a teletype machine or other device which converts the punch hole data into electrical pulses and feed such pulses to a digital computer for processing.

Figure 6:
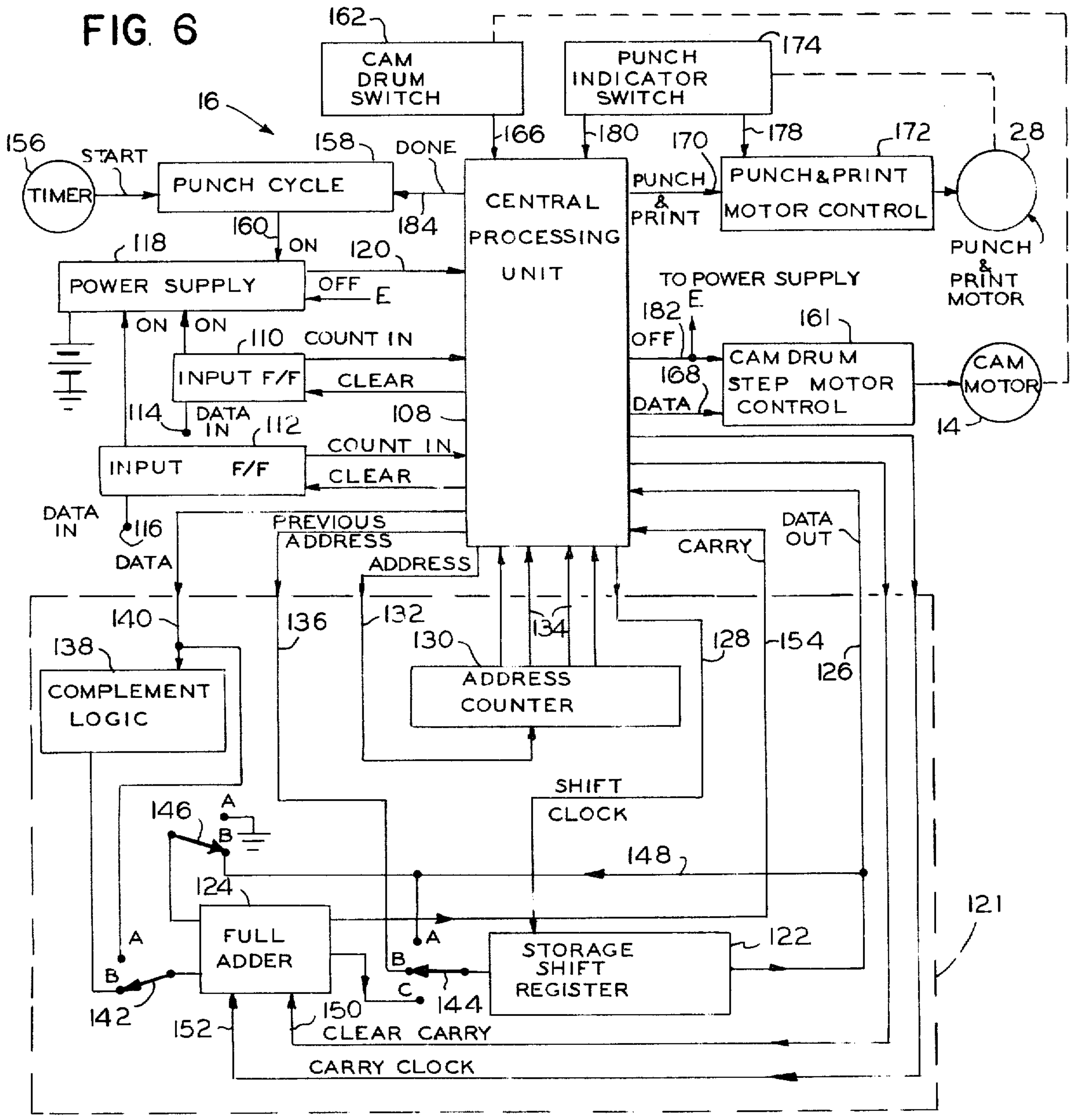
FIG. 6 is a block diagram of an electronic memory and control circuit used to drive the recorder of the present invention.

As shown in FIG. 6, the memory and control circuit 16 of FIG. 2 includes a central processing unit (CPU) 108 which is connected to the outputs of first and second input flip-flop circuits 110 and 112, whose input terminals 114 and 116, respectively, are connected to the input data signal sources. For example, the input data signal sources may be "road tube" transducer switches which produce an electrical output pulse each time the wheel tire of an automobile, truck or other vehicle rolls over such road tube. These data input pulses trigger the bistable flip-flops 110 and 112 which temporarily store such input data and supply corresponding count pulses to the central processing unit 108 until such flip-flops are reverted by a clearing pulse applied thereto by the C.P.U. In addition, the input flip-flops 110 and 112, when triggered, apply "turn on" pulses to a power supply circuit 118 which then supplies power through output 120 to the C.P.U. to enable it to operate. The input data pulses supplied by flip-flops 110 and 112 are transmitted from the C.P.U. 108 to a read-write electronic memory 121 including a digital counter 122 which may be a series-in, series-out, binary counter shift register. The storage shift register 122 receives the input data pulses through a full adder circuit 124 having a "carry" flip-flop therein. Such input data pulses are counted and stored in shift register 122 which provides a data readout signal at a data output terminal 126 at a slower rate than the input data pulses are received. The readout rate of the memory 121 is determined by shift clock pulses applied by the C.P.U. to shift clock input 128 of the shift register 122. Each digit of a multiple digit data number stored in the shift register 122 is read out of the shift register serially one digit at a time, each digit being represented by four binary coded 0 or 1 bits which are recorded on punched tape, as shown by the four horizontal rows of data holes for each vertical row of punched data 102 in FIG. 5.

An address counter 130 is provided which may also be a binary pulse counter with an address signal input 132 supplied by the central processing unit 108 and a plurality of address outputs connected to the C.P.U. The address counter 130 stores the position of each digit of the data number in the shift register 122, such address counter advancing one count for every four shifts of the shift register. A previous address input 136 is connected to the storage shift register 122 by the central processing unit to enable it to store the previous address for later use. A complementary logic circuit 138 is connected between the data input terminal 140 of the memory and one input of the adder 124 during the punching record operation to enable subtraction of a predetermined number of "data" pulses from the storage shift register by adding the complement of such data pulses to the output signal of such shift register which is applied to the other input of the adder. It should be noted when such subtraction takes place, the data pulses being subtracted are produced by the central processing unit and not by the data input flip-flops 110 and 112. A pair of electronic switching circuits 142 and 144 are connected to the inputs of the adder 124 and the storage shift register 122, respectively, in order to selectively connect them to different inputs at a time determined by control signals (not shown) which are applied to such switches by the central processing unit. A third switch circuit 146 is provided between the upper input of the adder 124 and a comparison line 148 connected to the output of the storage shift register. It should be understood that these switch circuits have been shown as mechanical switches merely for purposes of simplicity.

The operation of the read-write memory for storing and punching a multi-digit data number includes the following steps.

First, switch 144 is moved to the upper A-position and switch 146 is moved to the A-position grounding the upper input to the adder 124 and leaving the data input of the storage shift register 122 connected to its output. At the same time, a switch 142 is moved to its A-position and a clear carry input 150 is provided to the full adder 124 by the C.P.U. to revert the carry flip-flop in such adder. Then shift clock pulses are applied to the storage shift register through line 128 to change the address of such shift register without losing any counts since its input is tied to its output until it is in the address position corresponding to a "home" or reference position. As discussed above, the address counter 130 is also shifted one position for each four shifts of the storage shift register 122 to change the address seen by the C.P.U. until it too is in the "home" position.

In order to count and store data input pulses produced by triggering the input flip-flops 110 and 112, switch 144 is moved into the C-position, switch 142 is left in the A-position, while switch 146 is moved to the B-position. As a result, when binary data input pulses are extracted from flip-flops 110 or 112 through the central processing unit 108 to data input 140, such data input pulses are applied to one input of the full adder 124 where they are added to the previous number stored in the storage shift register 122, which is applied to another input of the adder through line 148. The binary sum produced in the adder 124 is then transmitted from the output of the adder through switch 144 to the input of the storage shift register. At the same time, shift pulses are applied to the shift register through line 128, shifting these input data pulses into the shift register. Carry clock pulses are applied to the clock input 152 of the full adder to produce the output signal of such adder. In addition, the adder 124 produces a carry output 154 which is applied to the central processing unit. It should be noted that where a plurality of input data sources are employed, the central processing unit includes a parallel to series converter so that these parallel input pulses are applied in series to the binary data input 140 of the memory 121.

The storage shift register may be used for control functions, including controlling the cam drum position to move such cam drum to the proper position to punch the number stored in the shift register, to control a timer 156 which starts the punch cycle circuit 158, and to control subtractions of pulses from the stored number in the shift register corresponding to the numbers punched.

The subtraction and punching of the multiple digit data number stored in the memory 121 will now be described. In this case, the switch 144 is in the C-position, switch 142 is in the B-position, and switch 146 is in the B-position. As a result, a predetermined number of input pulses applied to the data input line 140 by the central processing unit are transmitted through the complement logic circuit 138 and are added by the full adder 124 to the output of the storage register 122, so that such adder actually performs a binary subtraction of such input bits. The value of the most significant digit in the data number is so determined and then punched. Afterwards the next significant digit in such data number is also determined and punched in a similar manner. It should be noted that the predetermined input pulses, such as 1,000, 100, 10 or 1, are produced by the central processing unit and are not data input pulses supplied by the input flip-flops 110 and 112. This subtraction and punching is continued until the number stored in the shift register 122 is reduced to zero or a small number, depending upon whether or not input data pulses are produced by input flip-flops 110 and 112 during the total punching period of the multi-digit data number. For example, we will assume that the data number 4999 is stored in the read-write memory 121. Since the stored data number is 4999, the most significant digit 4 is determined by subtracting 1000 from this number four times, leaving a total of 999 in the memory and causing a digit-to-punch word in such memory to be set to 4. Actually this is done by subtracting a 1000 input pulse from the memory five times until a −1 is produced in the memory and then adding a 1000 back to provide a number of 999 in the memory. As a result, the most significant or thousands digit, 4, is determined and is then punched by the central processing unit. However, before punching, the cam drum must be "homed" at the start of the punching cycle, which begins by actuating timer 156 to cause the punch cycle circuit 158 to produce an output 160 that turns on the power supply 118 to the central processing unit 108. The central processing unit produces output steps which cause a cam drum motor control circuit 161 to rotate the cam motor into a home position. This is sensed by a homing switch 162 which may be a magnetically operated read switch positioned adjacent the cam drum and actuated by a permanent magnet 164 which rotates with the cam drum. The homing switch 162 produces a homing output signal 166 which tells the central processing unit that the punching operation may begin and the above-mentioned subtraction process starts in the memory. After homing and determination of the most significant digit, the C.P.U. applies a corresponding output step signal 168 to the cam motor drive 161 to move the cam motor 14 in steps until it reaches the number 4 position. Then the central processing unit produces a punch signal output 170 which is applied to a punch and print drive motor control 172 whose output actuates the punch and print motor 28 and causes this 4 digit to be punched and printed on the tape by moving the punch head in the manner described above. When punching is completed, a punch indicator switch 174 is operated by the tape advance pawl 24 to indicate that the thousands digit has been punched and the punch pins are clear to enable the hundreds digit of the multiple digit data number to be punched. The punch indicator switch 174 may be a reed switch positioned adjacent the tape advance pawl 24 and actuated by a permanent magnet 176 mounted for movement with such pawl, as shown in FIG. 1. This punch indicator switch provides a "prepare to punch" output 178 to the punch and print drive control 172, and also provides a "punch pin clear" signal 180 after punching and advancement of the tape, to the central processing unit. After the punch tape is advanced and the punch pins are retracted, the central processing unit causes the second digit to be extracted from the storage shift register 122 and punched.

In the next punching step, the central processing unit determines the hundred digit 9 of the remaining data number 999 stored in the shift register 122 by subtracting 100 pulses nine times from the stored number of 999 to leave the balance number of 99 stored in the shift register 122. Then the central processing unit actuates the cam motor drive 161 and steps the cam motor from its previous setting of 4 directly to its new setting of 9, and thereafter actuates the punch motor drive 172 and the punch motor 28 in the manner indicated above in order to punch and print the number 9 as the hundreds digit. Of course, each 100 pulse group subtracted from the storage shift register is generated in the central processing unit and transmitted through the complement logic circuit 138 to the full adder 124 which then subtracts it from the output of the storage shift register. The binary sum output of such adder is then applied to the input of the shift register to cause it to shift to the new remainder number. It should be noted that the cam drum is not homed between digits, but instead is differentially driven from one digit to the next which considerably reduces punching time for a multiple digit number. Instead of a mechanical homing operation, homing is done electronically by resetting the digit-to-punch counter stage to zero after punching each digit.

In order to determine and punch the tens digit of the data number, the digit-to-punch counter is again reset to zero and 10 input pulses are subtracted nine times from the stored number remaining in the shift register 122, leaving a balance number of 9 in the shift register. The central processing unit then orders the cam drum motor to move such cam drum from its previous position of 9 to its new position of 9, which means no movement at all, and then operates the punch drive and punch motor to cause punching of 9 for the tens digit on the tape. If a vehicle crosses one of the road tubes at this time, the input flip-flops 110 and 112 produce an input data pulse which is transmitted to the full adder by the C.P.U. 108 which automatically moves switch 142 to the A-position and adds this input pulse to the stored number in the shift register. Thus, the central processing unit is continuously scanning the input flip-flops 110, 112 every few milliseconds and such flip-flops act as temporary one bit storage devices. Thus, if this additional input data bit is added to the shift register, the stored remainder number in such shift register shifts from 9 to 10.

Then the units digit is determined by subtracting 1 from the remainder number in such shift register nine times, after resetting the digit to punch counter to zero. A units digit of 9 is then punched on the tape in the manner described above, leaving a balance in the memory shift register of 1. This balance is added to any new data input pulses thereafter received, and therefore is not lost.

In addition to the four digits of the data number which are punched, the central processing unit also causes punching of a binary coded "carriage return" instruction and a "line feed" instruction which are used to operate a teletypewriter controlled by the punched tape. Alternatively, the line feed instruction may be punched before the data number as shown in the tape format of FIG. 5. After this "word" consisting of six punching operations is completed, the central processing unit returns all of the drive circuits to their quiescent state, applies an "off" output 182 to the cam motor control 161 and the power supply 118, and applies a "punching done" output 184 to the punch cycle circuit 158 to terminate the punching operation.

It will be obvious to those having ordinary skill in the art that many changes may be made in the above-described details of the preferred embodiments of the invention without departing from the spirit of the invention. Therefore, the scope of the present invention should only be determined by the following claims.

We claim:

1. A punched tape recorder in which the improvement comprises:

rotary cam means including a plurality of cam recesses and cam surfaces arranged in a binary code to provide at a readout position a different number or character for each of a plurality of rotational positions of said cam means;

motor means including a cam motor for rotating said cam means between said rotational positions in response to electrical signals applied to said cam motor;

punch means for punching a tape with holes arranged in said binary code in response to punch pins engaging said cam recesses and cam surfaces at said readout position;

input means for supplying input data as electrical input signals; and electronic memory means for receiving and storing a plurality of data input signals supplied thereto by said input means, and for producing a corresponding digital data output signal which is applied to said cam motor means to cause said cam motor means to rotate said cam means.

2. A recorder in accordance with claim 1 in which the memory means includes a digital pulse counter and the input means supplies said data input signals as digital pulses to said memory.

3. A recorder in accordance with claim 2 in which the digital input pulses are grouped in discrete binary coded words which are supplied to said memory.

4. A recorder in accordance with claim 1 which also includes a print means for printing on said tape data numbers or characters corresponding to said coded holes adjacent to said holes.

5. A recorder in accordance with claim 4 in which the print means prints said numbers or characters simultaneously with the punching of said holes and includes a print wheel mounted on the same shaft as said cam means, said shaft being connected to said cam motor.

6. A recorder in accordance with claim 1 in which the cam motor is a step motor which rotates said shaft intermittently in response to receipt of the stored input signals.

7. A recorder in accordance with claim 4 in which the punch tape is pressure sensitive so that it prints said numbers or characters on contact with a print element.

8. A recorder in accordance with claim 1 in which the memory means includes a digital read-write memory circuit having digital data input pulses applied thereto which it stores to provide a multiple digit data output signal which is read out serially to the cam motor means and punched one digit at a time.

9. A recorder in accordance with claim 8 in which the cam motor is a step motor operated differentially by said memory means to cause the cam means to rotate directly from one punched digit number to another of the same data output signal without homing the cam means to a reference setting.

10. A recorder in accordance with claim 2 in which the counter is a serial input, serial output shift register whose output operates the cam motor means and causes the punch means to punch a multiple digit data number on the tape one digit at a time, each punched digit corresponding to the setting of a single rotary cam means, and control means for subtracting the numbers to be punched from the stored number in said shift register by converting the code of the stored number, and for adding to said stored number any input pulses supplied by said input means during the punching period of the multiple digit number.

11. A recorder in accordance with claim 1 in which the punch means includes a punch head having a plurality of apertures through which said punch pins extend to punch holes in said tape, carriage means for moving said punch head toward and away from said cam means, and punch motor means for operating said carriage means to cause punching upon receipt of a control signal corresponding to the operation of said cam motor means by the memory means.

12. A recorder in accordance with claim 11 in which said punch motor means also operates a tape advance ratchet means for advancing said tape one step for each punching operation, and said punch means and cam means cause the digits of the readout number or character to each be punched at different longitudinal positions on said tape.

13. A recorder in accordance with claim 1 in which the punch means includes a tape advance ratchet means for moving said tape having a pawl with a resilient end portion that is engaged by a cam wheel which drives said pawl to advance said tape and causes said end portion to bend when said pawl engages a stop means.

14. A recorder in accordance with claim 13 in which the pawl is made of a synthetic plastic material and the resilient end portion is a spring-like lever arm of reduced width made of said plastic material.

15. A printed and punched tape recorder in which the improvement comprises:

input means for supplying input data as electrical input signals;

electronic memory means for receiving and storing a plurality of data input signals supplied thereto by said input means, and for producing a digital data output signal corresponding to the stored data input signals;

punch means for punching a tape with holes arranged in a digital code to provide a punched number corresponding to said digital data output signal;

print means for printing a number on said tape corresonding to said punched number; and control means including an actuator motor connected to the output of said memory means for operating said punch means and said print means, said motor being energized in response to said digit data output signal.

16. A recorder in accordance with claim 15 in which the memory means includes a digital pulse counter and the input means supplies said data input signals as digital pulses.

17. A recorder in accordance with claim 16 in which the counter is a shift register which provides the digital data output signal as a multiple digit number which is read out serially to the control means to punch and print one digit at a time beginning with the most significant digit.

18. A recorder in accordance with claim 17 in which the control means causes the punched number to be subtracted from the stored number in the shift register and causes a further input data number corresponding to any input pulses supplied by said input means during the punching period of the multiple digit number.

19. A recorder in accordance with claim 15 in which the control means operates said punch means and said print means simultaneously.

20. A recorder in accordance with claim 19 in which the control means includes a motor driven shaft while the punch means is cam actuated by a rotary punch cam means attached to said shaft and the print means includes a print indicia wheel attached to said shaft.

21. A recorder in accordance with claim 15 in which the tape is a pressure sensitive printing tape.

* * * * *